United States Patent
Mahajan (10) Patent No.: US 9,672,534 B2
(45) Date of Patent: *Jun. 6, 2017

(54) PREPARING CONTENT PACKAGES (71) Applicant: Accenture Global Service Limited, Dublin (IE)

(72) Inventor: Rahul Mahajan, New Delhi (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/632,885

(22) Filed: Feb. 26, 2015

(65) Prior Publication Data

US 2015/0169779 A1 Jun. 18, 2015

Related U.S. Application Data

(63) Continuation of application No. 13/269,389, filed on Oct. 7, 2011, now Pat. No. 8,996,650.

(30) Foreign Application Priority Data

Aug. 26, 2011 (IN) .......................... 2920/CHE/2011

(51) Int. Cl.
*G06F 17/30* (2006.01)
*G06Q 30/02* (2012.01)
(Continued)

(52) U.S. Cl.
CPC ... *G06Q 30/0269* (2013.01); *G06F 17/30029* (2013.01); *G06F 17/30876* (2013.01);
(Continued)

(58) Field of Classification Search
CPC ............... G06Q 30/02; G06Q 30/0251; G06Q 30/0254; G06Q 30/0269; G06F 17/30029; G06F 17/30876; H04L 65/605
(Continued)

(56) References Cited

U.S. PATENT DOCUMENTS 7,185,355 B1 2/2007 Ellis et al.
7,293,276 B2 11/2007 Phillips et al.
(Continued)

FOREIGN PATENT DOCUMENTS

WO 2008112281 A3 11/2008

OTHER PUBLICATIONS

There's more on TV than television., GoogleTV, <http://www.google.com/tv/features.html> Jan. 18, 2011.
(Continued)

*Primary Examiner* — Ramy M Osman
(74) *Attorney, Agent, or Firm* — Mannava & Kang, P.C.

(57) ABSTRACT

Preparing a content package by determining a requesting user profile based on the requesting user identity. This includes calculating an inclusion value for a content file based on at least one factor. The factor may be a social networking factor. The social networking factor is based on a profile attribute linking the requesting user identity to at least one friend user identity and a content rating attribute linking the content file to the friend profile. Other factors are a content aging factor based on a content age value and a request length factor based on a content length value. The calculated inclusion value is compared to an inclusion condition. If the calculated inclusion value satisfies the inclusion condition, incorporating the content file into the content package.

19 Claims, 8 Drawing Sheets

(51) Int. Cl.
*H04L 29/06* (2006.01)
*H04N 21/25* (2011.01)
*H04N 21/2668* (2011.01)
*G06Q 50/00* (2012.01)

(52) U.S. Cl.
CPC ......... *G06Q 30/02* (2013.01); *G06Q 30/0251* (2013.01); *G06Q 30/0254* (2013.01); *H04L 65/605* (2013.01); *H04N 21/252* (2013.01); *H04N 21/2668* (2013.01); *G06Q 50/01* (2013.01)

(58) Field of Classification Search
USPC .......................... 709/201, 203, 217, 223, 246
See application file for complete search history.

(56) References Cited

U.S. PATENT DOCUMENTS

| | | | |
|---|---|---|---|
| 7,971,217 B2 | 6/2011 | Masumitsu et al. | |
| 8,019,777 B2 | 9/2011 | Hauser | |
| 8,332,512 B1 * | 12/2012 | Wu | G06Q 30/0254 705/319 |
| 8,433,611 B2 | 4/2013 | Lax et al. | |
| 8,489,458 B2 * | 7/2013 | Reis | G06Q 30/02 705/14.53 |
| 8,504,437 B1 | 8/2013 | Agarwal et al. | |
| 8,649,805 B2 | 2/2014 | Ruckart et al. | |
| 8,671,094 B2 | 3/2014 | Kang et al. | |
| 8,732,240 B1 * | 5/2014 | Tomkins | G06Q 30/02 709/204 |
| 8,751,305 B2 | 6/2014 | Manoogian, III et al. | |
| 2001/0003213 A1 | 6/2001 | Marics | |
| 2002/0157095 A1 | 10/2002 | Masumitsu et al. | |
| 2003/0056216 A1 | 3/2003 | Wugofski et al. | |
| 2003/0145326 A1 | 7/2003 | Gutta et al. | |
| 2003/0204846 A1 | 10/2003 | Breen et al. | |
| 2004/0122824 A1 | 6/2004 | Clearwater | |
| 2004/0268403 A1 | 12/2004 | Krieger et al. | |
| 2006/0271953 A1 | 11/2006 | Jacoby et al. | |
| 2007/0006277 A1 | 1/2007 | Mills et al. | |
| 2007/0157248 A1 | 7/2007 | Ellis | |
| 2007/0198740 A1 | 8/2007 | Peters et al. | |
| 2007/0271582 A1 | 11/2007 | Ellis et al. | |
| 2008/0049767 A1 | 2/2008 | Koltenuk | |
| 2008/0109242 A1 | 5/2008 | Shear et al. | |
| 2008/0261516 A1 | 10/2008 | Robinson | |
| 2008/0270579 A1 | 10/2008 | Hertz et al. | |
| 2008/0271087 A1 | 10/2008 | Robinson et al. | |
| 2008/0313040 A1 | 12/2008 | Rose et al. | |
| 2009/0094093 A1 | 4/2009 | Phan | |
| 2009/0197236 A1 | 8/2009 | Phillips, II | |
| 2009/0228335 A1 | 9/2009 | Niyogi et al. | |
| 2010/0030648 A1 * | 2/2010 | Manolescu | G06Q 30/0269 705/14.66 |
| 2010/0099446 A1 | 4/2010 | Panigrahi et al. | |
| 2010/0153989 A1 | 6/2010 | Jing et al. | |
| 2010/0257023 A1 | 10/2010 | Kendall et al. | |
| 2010/0287588 A1 | 11/2010 | Cox et al. | |
| 2010/0312768 A1 | 12/2010 | Shear et al. | |
| 2011/0153413 A1 | 6/2011 | Chunilal | |
| 2011/0153423 A1 | 6/2011 | Elvekrog et al. | |
| 2012/0054042 A1 | 3/2012 | Kawamoto et al. | |
| 2012/0166530 A1 | 6/2012 | Tseng | |
| 2012/0226564 A1 * | 9/2012 | Mirrokni Banadaki | G06Q 30/0254 705/14.66 |
| 2013/0030913 A1 | 1/2013 | Zhu et al. | |
| 2013/0073632 A1 | 3/2013 | Fedorov et al. | |
| 2013/0097153 A1 | 4/2013 | Barbieri et al. | |

OTHER PUBLICATIONS

Apple—Apple TV—Rent HD movies and TV shoes, stream Netflix, and more. <http://www.apple.com/appletv/> Jan. 18, 2011.
Samsung Internet@TV, Samsung Internet@TV-TV Technology Article. <http://www.televisions.com/tv-articles/Samsung-InternetTV.php> Jan. 19, 2011.
Broadcom's Connected Digital TV and Blu-ray Disc Platforms Power a Wide Range of LG Devices. Broadcom.com. <http://www.broadcom.com/press/release/pho?id=s541749> Jan. 19, 2011.
Logitech Revue With Google TV. Logitech. <http://www.logitech.com/en-us/smartTV/revue> Jan. 19, 2011.

* cited by examiner

PREPARING CONTENT PACKAGES

PRIORITY

This application is a Continuation of commonly assigned and copending U.S. patent application Ser. No. 13/269,389, filed Oct. 7, 2011, and entitled "PREPARING CONTENT PACKAGES", which claims priority to Indian Patent Application No. 2920/CHE/2011, filed on Aug. 26, 2011, which are incorporated by reference in their entireties.

BACKGROUND

A great variety of different types of content, such as video and music, is available through diverse content delivery systems including cable, satellite, broadcast television systems, the Internet, and satellite radio systems. The content delivery systems typically provide their users with the content through media channels, such as pay per view cable offerings, television channels, radio stations, and Internet web sites. Media channels may provide content by carrying a number of different media, such as video programming (e.g., broadcast television programming, on-demand video programming), audio programming (e.g., music channels, audio-on-demand programming), and interactive applications (e.g., games and shopping applications). In view of the myriad of various content delivery systems, media channels and the vast amounts and types of content offered to users, efforts have developed to organize the content offerings for the users. Programming guidance applications, including program guides, are one such effort. They provide an interface which organizes information associated with the content, such as media listings and subject matter descriptions, to better enable access to the media content from content sources and distribution systems.

An electronic program guide (EPG) is a common type of programming guidance application. It is typically implemented through a user set-top box and allows users to view program listings for multiple television and/or cable network channels. Commonly, users of an EPG search and sort program listings by genre (e.g., movies, sports, etc.), sub-genre (e.g., movies that are drama, comedy or non-fiction) or by title (e.g., alphabetically).

EPGs generally do not extent beyond television programming. However, in recent years there has been an advent of multiple different types of platforms for accessing content. Different types of platforms include personal digital assistants, personal media players, cellular phones, personal computers, gaming platforms.

Given the variety of platforms, content sources and content types, and with so much content now available which is distributed through different media channels, this places a burden upon a user to make selections of content which are relevant to their interests. This burden is especially acute when the user has limited time available, prior to making the content selection, for selecting relevant content for enjoyment. The user must expend considerable effort locating the desired content from among various available sources and then considering factors such as a given length of time or a specific time frame for using the content. Furthermore, the user has the added burden of needing to be informed regarding the subject matter of the available content prior to making any content selections which would be relevant to their goal.

SUMMARY

According to an embodiment of the invention, a system is provided for selecting relevant content from a broad range of choices and/or sources and incorporating the selected content into a content package for a user. The selected content files in the content package may be taken from any number of sources, such as a database or a media channel. The content files may be selected utilizing attributes in a content file record and/or metadata tagged to one or more content objects in a content file. The content file selections may be determined such that the user is easily and naturally provided a content package which is tailored to include content files which accurately and precisely reflect content subject matter that may be of interest to a specific user.

The content files may be selected for a content package without requiring extensive prior inquiries by the user as to the subject matter in the content files available for selection. Furthermore, a user may not be burdened with providing detailed specifications about the content files which may be selected for a content package. Content selections for a content package may be determined to meet the user's desires without the user having any specific prior knowledge about the subject matter of content in the content files which are selected for preparing the content package for the user.

These and other objects are accomplished in accordance with the principles of the invention in providing a system, method and computer readable medium which prepares content packages.

According to one principle of the invention, there is a system for preparing a content package. The system may include a dashboard to receive a user request including a requesting user identity. The system may also include a data management module to determine a requesting user profile based on the requesting user identity. The system may also include a package generator to calculate an inclusion value for a content file. The calculation may be based on one or more profile attributes associated with the requesting user profile and one or more content file attributes associated with the content file. The calculation may also be based on one or more factors. The one or more factors may include a social networking factor based on a requesting user profile attribute linking the requesting user identity to at least one friend user identity having an associated friend user profile. The social networking factor may also be based on a content rating attribute linking the content file to the friend user profile. The social networking factor may also be based on a content rating value associated with the content rating attribute and the friend user profile. The one or more factors may also include a content aging factor based on a content age value associated with the content file. The one or more factors may also include a request length factor based on a content file length value associated with the content file. The system may compare the calculated inclusion value to an inclusion condition. If the calculated inclusion value satisfies the inclusion condition, the system may select the content file for the content package, and incorporate the selected content file into the content package.

According to another principle of the invention, there is a method for preparing a content package. The method may include receiving a user request including a requesting user identity. The method may also include determining a requesting user profile based on the requesting user identity. The method may also include calculating an inclusion value for a content file. The calculating may be based on one or more profile attributes associated with the requesting user profile and one or more content file attributes associated with the content file. The calculating may also be based on one or more factors. The one or more factors may include a social networking factor based on a requesting user profile attribute linking the requesting user identity to at least one friend user identity having an associated friend user profile. The social networking factor may also be based on a content rating attribute linking the content file to the friend user profile. The social networking factor may also be based on a content rating value associated with the content rating attribute and the friend user profile. The one or more factors may also include a content aging factor based on a content age value associated with the content file. The one or more factors may also include a request length factor based on a content file length value associated with the content file. The method may include comparing the calculated inclusion value to an inclusion condition. If the calculated inclusion value satisfies the inclusion condition, the method may include selecting the content file for the content package, and incorporating the selected content file into the content package.

According to another principle of the invention, there is a non-transitory computer readable medium (CRM) storing computer readable instructions that when executed by a computer system perform a method for preparing a content package. The method may include receiving a user request including a requesting user identity. The method may also include determining a requesting user profile based on the requesting user identity. The method may also include calculating an inclusion value for a content file. The calculating may be based on one or more profile attributes associated with the requesting user profile and one or more content file attributes associated with the content file. The calculating may also be based on one or more factors. The one or more factors may include a social networking factor based on a requesting user profile attribute linking the requesting user identity to at least one friend user identity having an associated friend user profile. The social networking factor may also be based on a content rating attribute linking the content file to the friend user profile. The social networking factor may also be based on a content rating value associated with the content rating attribute and the friend user profile. The one or more factors may also include a content aging factor based on a content age value associated with the content file. The one or more factors may also include a request length factor based on a content file length value associated with the content file. The method may include comparing the calculated inclusion value to an inclusion condition. If the calculated inclusion value satisfies the inclusion condition, the method may include selecting the content file for the content package, and incorporating the selected content file into the content package.

Further features, their nature and various advantages will be more apparent from the accompanying drawings and the following detailed description of the preferred embodiments.

BRIEF DESCRIPTION OF THE DRAWINGS

Features of the examples and disclosure are apparent to those skilled in the art from the following description with reference to the figures, in which.

DETAILED DESCRIPTION

For simplicity and illustrative purposes, the present invention is described by referring mainly to embodiments and examples thereof. In the following description, numerous specific details are set forth in order to provide a thorough understanding of the embodiments. It is readily apparent however, that the present invention may be practiced without limitation to these specific details. In other instances, some methods and structures have not been described in detail so as not to unnecessarily obscure the description. Furthermore, different embodiments are described below. The embodiments may be used or performed together in different combinations. The term "based on" means based at least in part on.

According to an embodiment, a content package preparation (CPP) system generates content packages. A content file may include content, metadata and other information regarding content and combinations thereof. A content package may include one or more content files having one or more content objects. A content object is a unit of content, such as video, audio, pictures, multimedia, text, captions, web pages, etc. The content objects, for example, are digital content and may be compressed and then later decompressed for consumption by a user, which may including playing a content object on a device. The content package itself may be a file composed of multiple content files. The content package may have a playing time, which includes the total time to play the content objects (e.g., video, songs, etc.) in the content package.

The term content used on its own refers to one or more content objects which may be included in a content file and a content package. Users, content and content packages are associated with profiles. Profiles include attributes associated with identities assigned to the respective profiles and identify them as associated with specific users and/or content. Profiles may be linked by referencing or pointing to a non-assigned identity in an attribute of a profile assigned to another identity. The term content file used on its own may refer to the profile assigned to the content in the content file.

The CPP system is operable to select content files for a content package according to multiple factors described in detail below. The content files may be selected based on other criteria as well. The CPP system may select content files in response to a user request for a content package from a requesting user. The requesting user may be a member of a population of users associated with the CPP system, including friend users of the requesting user and other users in the population not associated as friends with the requesting user. A prepared content package may include one or more content files which the user may be authorized to access or use according to the requesting user's profile. A user may utilize a client device to transmit a request and/or to play the content in the prepared content package.

Figure 1A:
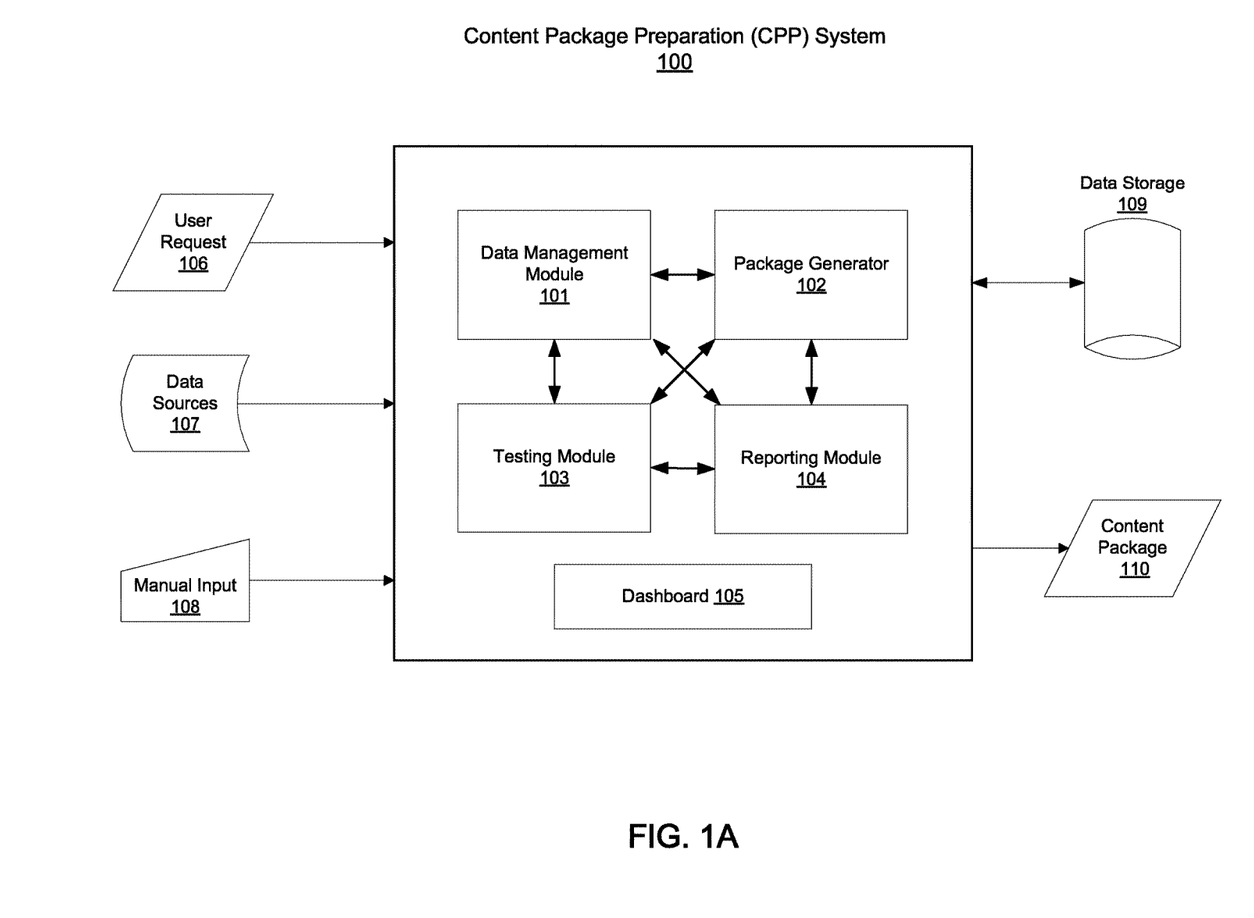
FIG. 1A is a block diagram illustrating a system which may be used for selecting content files for a content package, according to an example.

FIG. 1A illustrates a CPP system 100, according to an embodiment. The CPP system 100 prepares content packages, such as content package 110. The CPP system 100 includes a data management module 101, a package generator 102, a testing module 103, a reporting module 104 and a dashboard 105. A module, such as the modules 101, 103, 104, and the package generator 102, may include software, hardware, or a combination of both. The CPP system 100 receives data from a variety of sources, including user requests, such as a user request 106 and a manual input 108. The manual input 108 may include a user entering a request into the dashboard 105. The user may be connected to the CPP 100 and the dashboard 105 via a network. The CPP system 100 also receives external data from data sources, such as data sources 107. Data sources may include information or updates regarding content and content sources associated with the CPP system 100.

The CPP system 100 stores data in a data storage 109. The data storage 109 includes a data storage device which stores data organized in a manner which allows desired data, including information regarding users, user profiles, content, content files, content sources and associated metadata to be easily retrieved. For example, the data storage 109 may include a relational database or an online analytical processing (OLAP) system for retrieving data. The information stored in the data storage 109 may be organized by category according to attributes, such as attributes associated with users, content, and links between attributes. The data storage 109 may store any data used by the CPP 100. The package generator 102 may communicate with the testing module 103, receiving feedback in the form of test results regarding provisional or proposed content packages for responding to user request 106. The package generator 102 may also communicate with the reporting module 103, which provides status reports to the requesting user on the progress of preparing a content package in response to the user request 106.

Figure 1B:
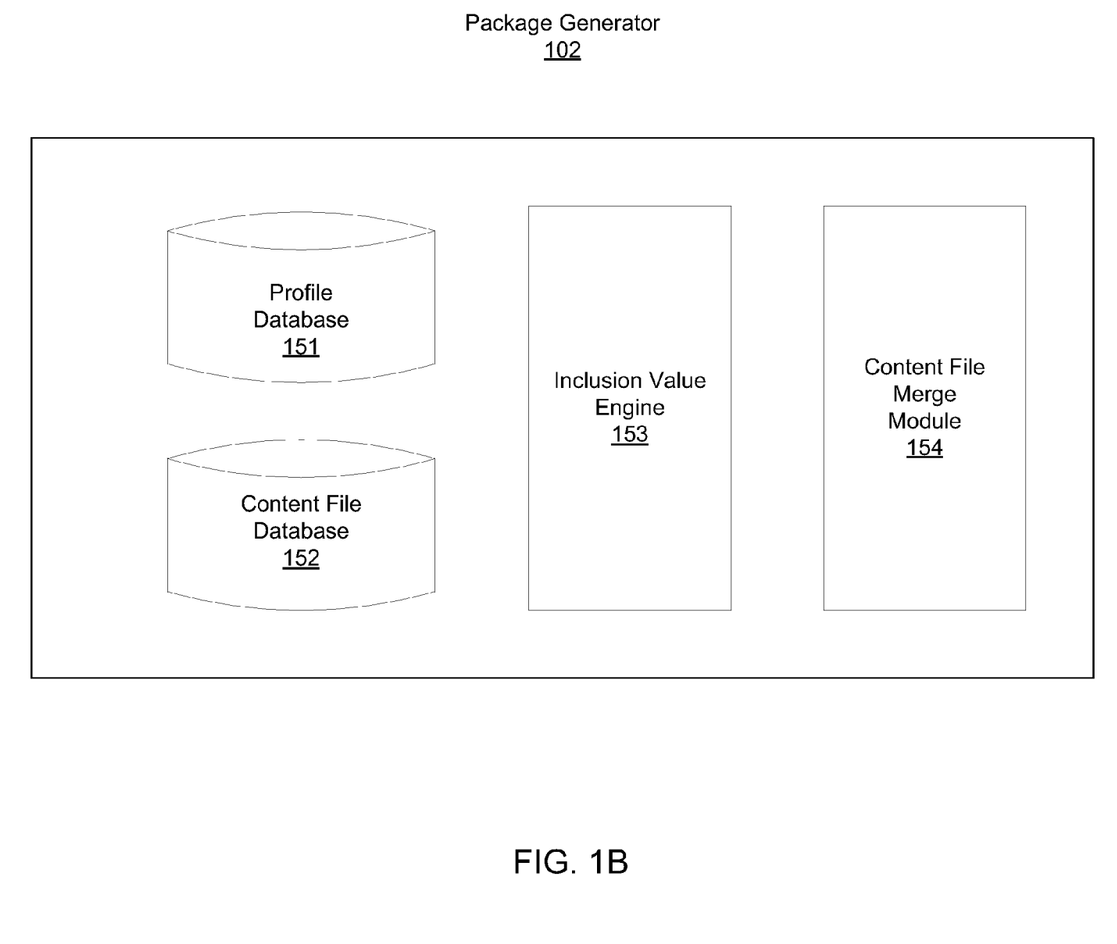
FIG. 1B is a block diagram illustrating a package generator which may be utilized in preparing a content package using the system in FIG. 1A, according to an example.

FIG. 1B illustrates the package generator 102 shown in the CPP system 100 of FIG. 1A, according to an example. The package generator 102 selects content files and incorporates them into content packages, such as content package 110. The package generator 102 includes a profile database 151, a content file database 152, an inclusion value engine 153, and a content file merge module 154. The package generator 102 communicates with the data management module 101 from which it receives information regarding received user requests, such as the user request 106. This information includes the requesting user identity and any other information which may be included in user request 106, such as a requested package length value and a package modifier specified by the requesting user. A package modifier can be any term or condition, other than a requested package length value, which may be utilized by the package generator 102 in selecting content files. Other information which may be received from the data management module 101 include manual input 108 and external data from data sources 107.

The package generator 102 may receive data from a variety of external sources described above. In addition, the package generator 102 may include a profile database 151 and a content file database 152 as its internal data sources.

The profile database 151 may be any type of database, including a relational database with user profile records as tuples of the relational database having user profile data in attributes associated with user profile records. For example, the profile database may include the requesting user profile record associated with the requesting user identity. The requesting user identity may be associated with one attribute and establish a relationship among other attributes in the user profile record. The requesting user identity may be stored or associated with the requesting user's profile record as an attribute of the profile record along with other information associated with the requesting user. Other information associated with the requesting user identity may include demographic information about the requesting user, content usage authorizations, specified interests designated by the requesting user or acquired from data sources 107, a history of content usage by the requesting user, collected metadata associated with content files in the history of content usage by the requesting user, collected location-based information associated with the requesting user identity, and/or other types of data. All these types of other information may be stored as attributes within all the user profile records in the profile database 151.

According to an example, the profile database 151 may be completely internal to the package generator 102. In another example, the profile database 151 database may be wholly or partially associated with an external database in data sources 107 and stored outside the CPP system 100. The external database may be accessed and/or utilized by the package generator 102, via the data management module 101, for providing attributes or other information associated with user profiles.

The content file database 152 may be any type of database, including a relational database with content file records as tuples of the relational database having content file attributes associated with content file records. According to an example, the content file database 152 may be completely internal to the package generator 102. In another example, the content file database may be wholly or partially associated and stored outside the CPP system 100, in an external database associated with data sources 107. The external database may be accessed and/or utilized by the package generator 102, via the data management module 101, for providing content object(s) or other information associated with content files. As noted above, content object(s) may be associated with a content file and/or a content file record. According to an example, content object(s) may be an attribute of the content file record in the content file database 152. In another example, content object(s) may also be referenced in a content file record and a storage location of the content object(s) is associated with the data sources 107 external to the CPP system 100.

The package generator 102 includes the inclusion value engine 153 for calculating one or more inclusion values for a content file. The calculated inclusion values may be based on profile attributes associated with user profiles, content file attributes associated with content files and factors, which are described in more detail below. Certain attributes and factors which may be utilized in calculating an inclusion value may be determined from information obtained or derived from the user request 106.

The user request information may be utilized by the CPP system 100 and/or the package generator 102 in selecting content files for a content package. In one example, the user request information may merely include a requesting user identity, such as a user registration number or some other identifier associated with the requesting user. In another example, the user request may contain the requesting user identity and a content package length value, which is a time period or a length, optionally derived from a specified time interval, during which the requesting user plans to view or experience the content of a content package prepared by the CPP system 100 in response to the user request. In still another example, the user request may contain other information, such as a package modifier. The package modifier may include a specified interest category, including a mood, a quality, or some other subjective or objective descriptor for use by the package generator 102 in determining content files selected for the content package. A mood may be associated with an emotion, an atmosphere or a condition, such as happy, party, soft, fast, romantic, etc.

After receiving the user request 106, the CPP system 100 may prepare a content package which is responsive to the user request 106 by utilizing the user request information in user request 106. The CPP system 100 may also utilize additional information obtained from databases associated with the CPP system 100. These associated databases may be internal or external to the CPP system 100, including, for example, the profile database 151, the content file database 152 and data sources 107.

The user request 106 may contain the requesting user identity. According to an example, the package generator 102 receives the information in user request 106 and utilizes the requesting user identity to determine a corresponding requesting user profile record in the profile database 151. Then, utilizing attributes in the user profile record, the package generator 102 may scan content file records in the content file database 151 and calculate inclusion values using the inclusion value engine 153, for the respective scanned content file records.

The inclusion value may be a number, a range, or a condition. According to an example, a calculated inclusion value determines the selection of a content file for a content package. The calculated inclusion value may be a measure of acceptability for including, or the potentially including, the content file in a content package prepared through the CPP system 100 in response to the user request. The determinant value in the inclusion condition may be pre-programmed within the CPP system 100, or designated by the requesting user, such as in a registration process in which the requesting user registers with the CPP system 100. Or the determinant value may be obtained otherwise, such by manual input 108, or be included in the user request 106. The calculated inclusion value may be compared, using the inclusion value engine 153, with an inclusion condition to determine if the calculated inclusion value is positive for inclusion, or potential inclusion, in a content package prepared by linking the selected content files as a content package via the content file merge module 154.

The content file merge module 154 may also generate metadata about the content package as a whole and tag it to the content package and/or signal it to the reporting module 104.

The package generator 102 may utilize the calculated inclusion value in a number of ways. According to one example, the package generator 102 scans all the content file records in the content file database 153 and selects content files having the highest calculated inclusion value for including in a content package responsive to the user request. In another example, the entire content file database cannot be scanned by the package generator 102 in a given time before the content package can be prepared or delivered. In this example, the calculated inclusion value may be utilized on a rolling admissions basis to fill the available slots in the content package as quickly as possible with content files, and immediately after the slots associated with the potential content package are assigned to the selected content files, the selected content files are linked as a content package via the content file merge module 154.

In yet another example, after the content package slots are initially assigned to provisionally selected content files having a positive calculated inclusion value, the package generator 102 continues scanning any remaining content files to locate those having a higher inclusion value for optimizing or reconfiguring the selected content files via the content file merge module 154 before the finalized content package is transmitted from the CPP system 100 in response to the user request. Other arrangements may also be utilized for configuring a content package based on the calculated inclusion values of the content files.

Factors

As noted above, an inclusion value associated with a content file may be calculated based on one or more factors which may utilize information associated with the attributes of the user profile record and/or the content file record. These factors may be utilized separately or in combination according to equations and/or formula implemented through, for example, the inclusion value engine 153, in calculating the inclusion value for a content file. These factors may include, but are not limited to, a social networking factor, a content aging factor, a request length factor, a specified interests factor, a population rating factor, a content usage factor and a location-based information factor.

The social networking factor utilizes attributes of friend profiles. Friend and user profiles may exist together in the profile database 151. According to another example, they may be associated through one or more external databases, such as a database associated with a commercial social networking website. The friend profile may include a content rating attribute which links a content file to the friend profile. The content rating value by a friend user of a content file may be used to quantify the social networking factor and its impact on the calculated inclusion value of a content file.

The social networking factor may be based on a requesting user profile attribute that links the requesting user identity to one or more friend user identities (i.e., user identities associated with a user profile as friends, in a social networking context, of a user assigned to or associated with the user identity of the user profile.). The social networking factor may also be based on a content rating attribute linking a content file to friend user profiles. A content rating value may be a simple condition as in "liking" the content in a content file. A content rating value may also be quantified as in a value or a range on a scale. The social networking factor may utilize some group level evaluation of several content rating values by friend users of the content in one or more content files associated with the content rating attribute in the friend user profiles. In an example, a number of friend users have rated a movie by assigning a number to quantify their satisfaction of several aspects of the movie.

The social networking factor may utilize a function, such as an average or mean, of content rating values assigned as one or more content rating attributes associated with the aspects of the content file. The social networking factor may be based solely content rating values assigned by friend users to a content file, linking their friend user profiles to the content rating attributes of a content file. In another example, the social networking factor may be based on additional criteria, including content rating values assigned by non-friend users to a content file, which may, or if the content is ranked anonymously, may not link their user profiles to the content rating attributes of a content file.

Figure 2:
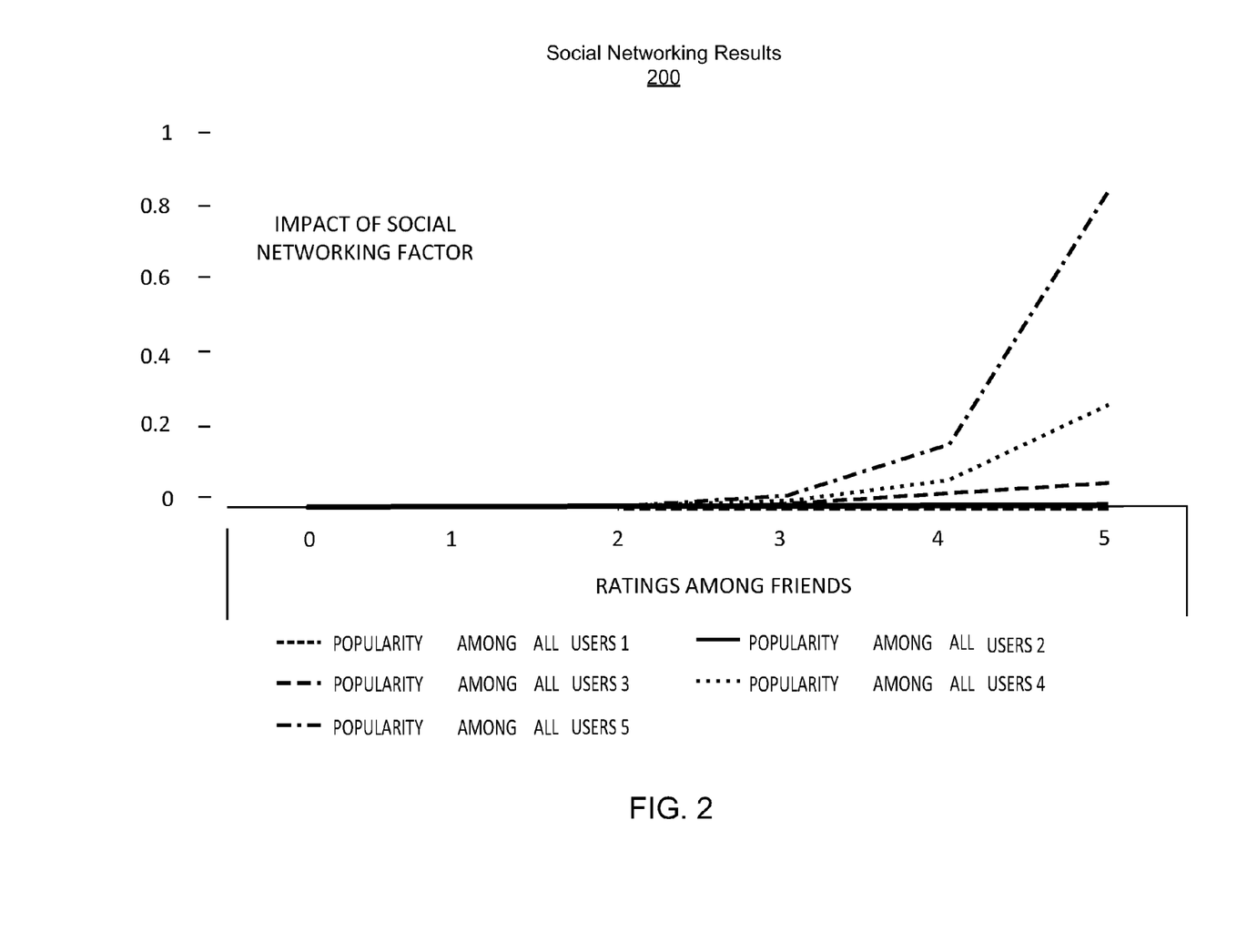
FIG. 2 is a graph illustrating an impact of a social networking factor which may be utilized in selecting the content files for the content package using the system in FIG. 1A, according to an example.

The social networking factor and its associated impact is demonstrated in FIG. 2 through social networking results 200.

FIG. 2 shows curves associated with content files having content rating values by friend users and content rating values by all users in a general population of users which includes non-friend users in the population. The curves graphically depict the impact of the social networking factor on a calculated inclusion value of a content file as a ratio (0 to 1). The y-axis is the impact of the social networking factor which in this example is normalized to be a ratio falling between 0 and 1. The x-axis shows an ascending scale of the average content rating value by friends (0 to 5). The curves are based on points showing the intersection of the average content rating values 0, 1, 2, 3, 4, or 5 which were assigned to content files by friend users (labeled along x-axis) and the average content rating values assigned by the general population of users (depicted as points along the curves) to the same content files. Note the curves depicted in the social networking results 200 for the popularity among all users being 1 and the popularity among all users being 2 both coincide and appear to overlap near to zero along the x-axis in FIG. 2.

The social networking results 200 demonstrate that even when the average content rating value among all users is very high (e.g., the curve for all users ranking 5 for a content), if the average content rating value among friends is low (i.e., 0-3), then the predictive impact of the social networking factor is to lower the calculated inclusion value of the content file to near to zero (shown on the left side of the graph). In this circumstance, the social networking factor has an impact of substantially lowering an inclusion value for a content file. Thus a content file with these characteristics would tend to be excluded from a content package. On the other hand, if the average rating by friend users and all users are both very high (i.e., ranking 5 for a content), the predictive impact of the social networking factor is negligible (approximately 1.0) and the social factor does not substantially impact the calculated inclusion value in a negative way.

The social networking factor may be expressed mathematically. According to an example, it may be expressed by the equation:

$$\frac{RatingsByFriends^{(RatingsByUsers)}}{MaxRating^{(MaxRating)}}$$

In this equation, the term RatingsByFriends may be a composite figure, such as a mean or a median, of values associated with ratings by friends assigned to a content piece or content file according to a rating scale. Similarly, the term RatingsByUsers may also be a composite figure of values associated with ratings by users assigned to the content piece or content file according to the rating scale. The term MaxRating describes the maximum rating value on a numeric scale for rating the content pieces or content files. In the example, the MaxRating is 5. This equation describes curves which resemble those shown in FIG. 2. The social networking factor may be assigned a priority among other factors, such as by a scaling factor as described in greater detail below.

The content aging factor utilizes one or more aging attributes of content files and/or content decay factors. The content aging factor may be based on a content age value associated with an attribute of a content file. The content age value may be a length of time which grows as the content ages with respect to some starting point in time associated with the content. A content decay factor utilized, according to an example, may be utilized in determining the content aging factor and be based on a decay value or decay rate associated with one or more attributes of a content file or a user profile. The attributes are associated with categories which describe the content or the user.

Figure 3:
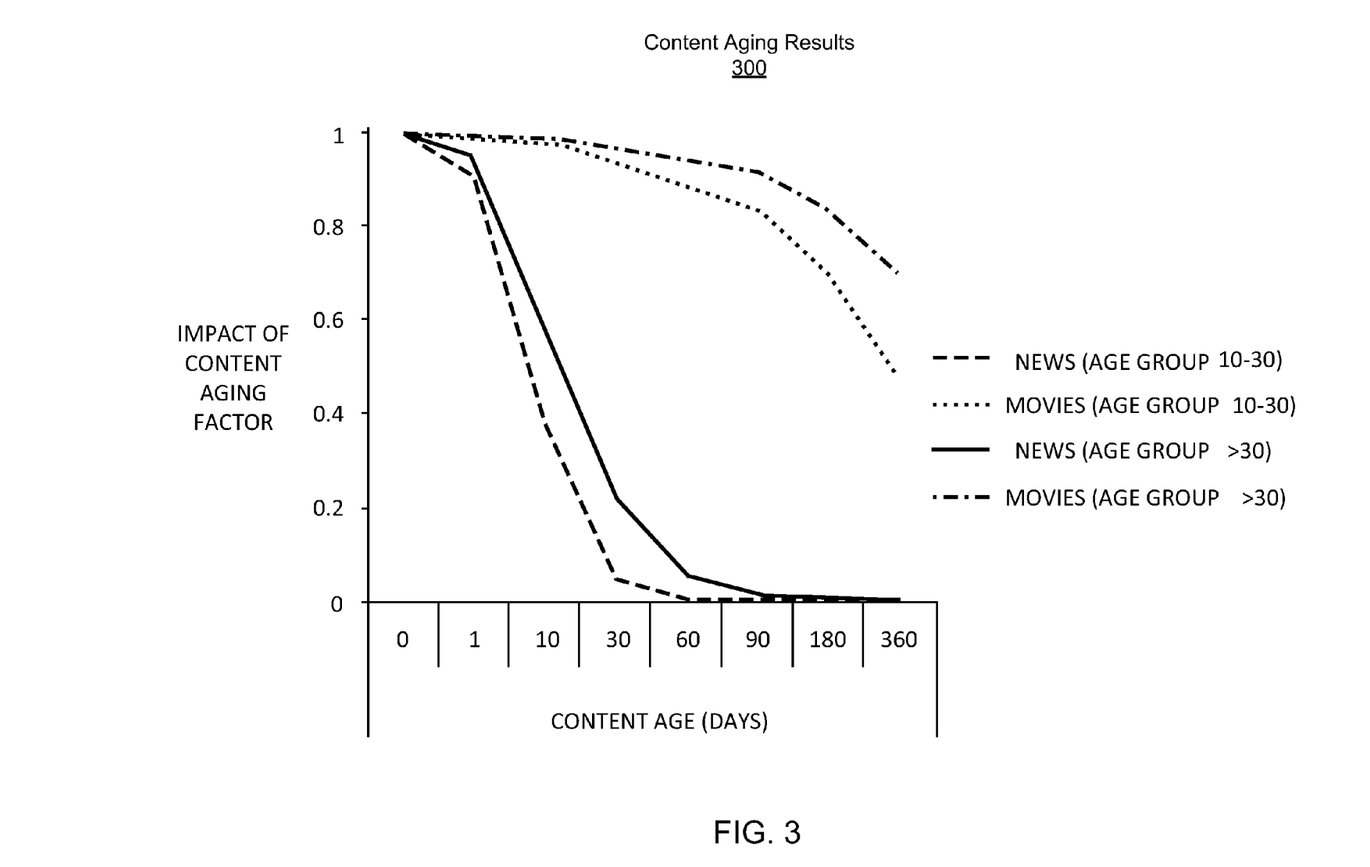
FIG. 3 is a graph illustrating an impact of a content aging factor which may be utilized in selecting content files for a content package using the system in FIG. 1A, according to an example.

The content aging factor and its associated impact is demonstrated in FIG. 3 through content aging results 300. FIG. 3 depicts curves associated with two categories, content media type and user age group. The content media type category is divided into subcategories for news and movies. The user age group category is divided subcategories for two user age groups, ages 10-30 and ages older than 30. The curves in content aging results 300 depict the impact of the content aging factor on a calculated inclusion value of content as a ratio (0 to 1), depending on the content age value and any decay factor.

In an example, as shown in content aging results 300, a calculated decay factor may be a number, such as a rate, associated with one or more attributes associated with categories describing the content or the users. In FIG. 3, the x-axis is an ascending scale of content age values associated with two types of content, movies and news. The results show that the impact of content age is more significant for news and for the younger age group, according to the decay factor assigned to those categories. The content aging results 300 also show that regardless of the categories and decay factors utilized, as content age values increases, the negative impact of the content aging factor upon a calculated inclusion value also tends to increase. However, the negative impact may be refined if decay factors are also utilized to determine the content aging factor for specific categories and subcategories.

The content aging factor may be expressed mathematically. According to an example, the content aging factor may be expressed by the equation:

$$e^{-1*\left(\frac{ContentAge}{ContentDecayFactor*UserAgeGroup}\right)} * maxProbabDistr$$

In this equation, the term ContentAge is a value based on an age associated with a content piece or content file. The term ContentDecayFactor is a value which may be associated with a content type which may be assigned to a content piece or a content file. Content types may include video, audio or text, or one or more subtypes, such as movies, action movies, music, graphical presentations, music, etc. The term ContentDecayFactor*UserAgeGroup is a value which may be associated with a content type and a defined age group, such as movies or news when consumed by a defined age group, such as ages 0 up to 2 year, 2 up to 10 years, 10 up to 30 years, 30 up to 50 years and older than 50 years. Different content decay factors may be determined by empirical evidence, estimates or imported from external sources and utilized in the CPP system 100. The equation describes curves which resemble those shown in FIG. 3. In this equation, the variables are the same as the corresponding variables described above with respect to FIG. 3.

The content aging factor equation may also be described by the variable: maxProbabDistr which represents a scaling factor for maximum probability distribution. Scaling factors merely associate a relative importance of one factor among all the factors in the equation. Different scaling factors may be applied to one or more factors in the equation according to the desired importance a user or system administrator may desire to assign to any factor for determining an inclusion value to be associated with a content file or content piece. The request length factor may be based on a requested package length value (i.e., requested length) in a user request. In another example, the request length factor may be based a content file length value associated with a content file. In another example, the request length factor may be based on both a requested package length value in a user request and a content file length value associated with a content file. The content package length may be proposed by the user in the user request, or may determined by the CPP system 100 based on other criteria.

Figure 4:
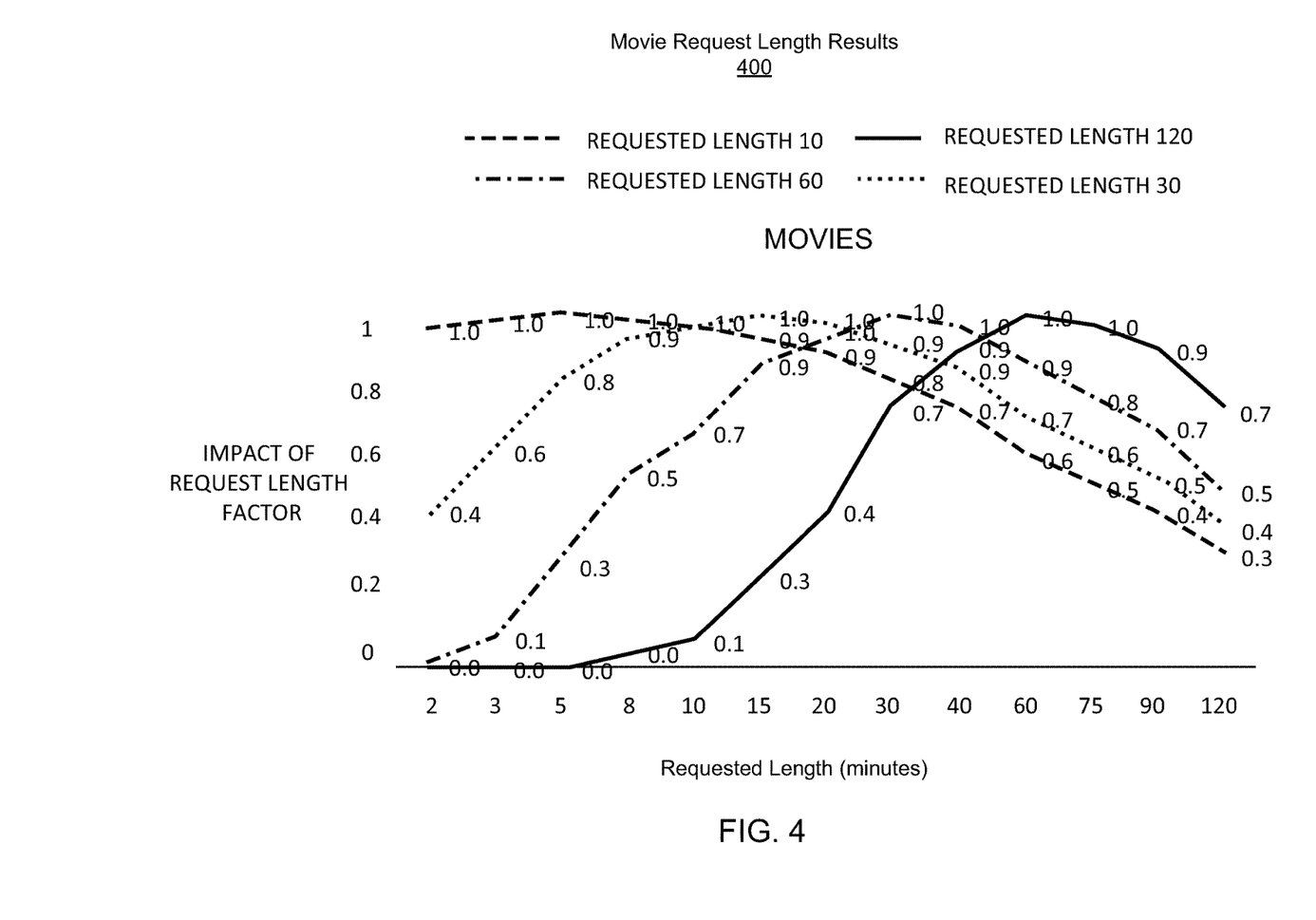
FIG. 4 is a graph illustrating an impact of a request length factor which may be utilized in selecting video content files that are movies for a content package using the system in FIG. 1A, according to an example.

The request length factor and its associated impact is demonstrated in FIG. 4 through movie request length results 400. Referring to FIG. 4, this figure shows movie request length results 400 for four different user request lengths (i.e., content package length values) in a user request. The curves of movie request length results 400 depict the impact of the request length factor on the calculated inclusion value of movie content as a ratio (0 to 1), depending on the length of a movie content file. The x-axis is an ascending scale of the requested lengths (i.e., content package length values) in minutes. The movie request length results 400 show that the impact of requested length factor for movie content is most significant when a movie content file length is shorter (i.e., 0 to 8 minutes). Also movie request length results 400 show that the request length factor has the least negative impact upon a calculated inclusion value for movie content when the requested length approximates the movie content file length.

Figure 5:
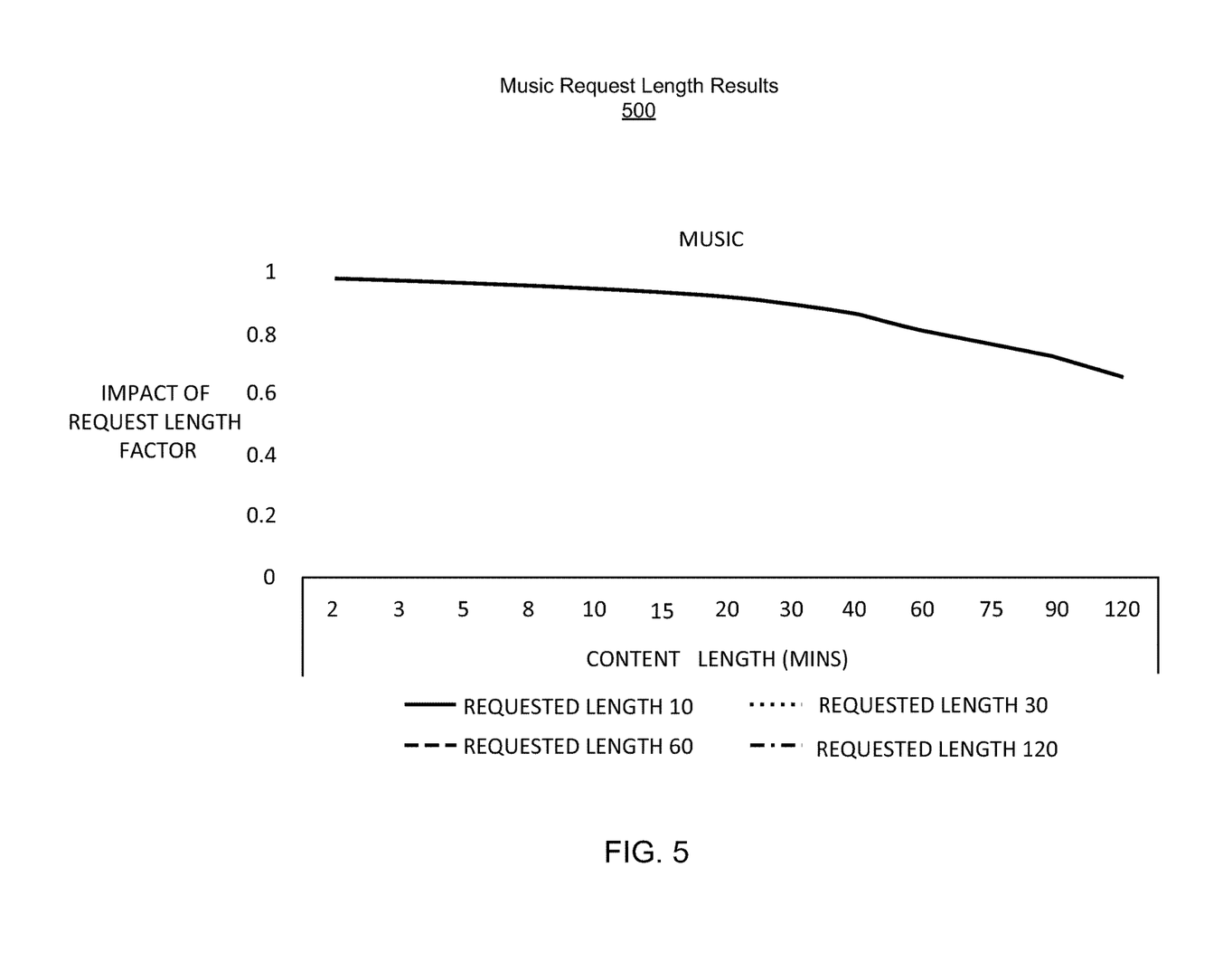
FIG. 5 is a graph illustrating an impact of a request length factor which may be utilized in selecting audio content files that are music for a content package using the system in FIG. 1A, according to an example.

The request length factor and its associated impact is also demonstrated in FIG. 5 through music request length results 500. FIG. 5 shows music request length results 500 for four different user request lengths (i.e., content package length values) in a user request. The curves of music request length results 500 depict the impact of the request length factor on the calculated inclusion value of music content as a ratio (0 to 1), depending on the music content file length. The x-axis is an ascending scale of the requested lengths (i.e., content package length values) in minutes. The music request length results 500 show that the negative impact of requested length factor for music is only slightly significant for longer requested lengths (i.e., above 40 minutes). Also music request length results 500 show that the request length factor has no significant difference in impact upon calculated inclusion values for music content files having highly variable music content file lengths (i.e., from 2 to 120 minutes). According to the music request length results 500, for music content there is very little impact associated with the content package length value. Note the curves depicted in the music request length results 500 for the requested length 10 minutes, the requested length 30 minutes, the requested length 60 minutes, and the requested length 120 minutes all coincide and appear to overlap along the same curve in FIG. 5. This suggests that, for music content, the request length factor tends to have only a slightly increasing negative impact on the calculated inclusion value based on an increased content file length of the music content files and is uniform regardless of the requested length.

The request length factor may be expressed mathematically. According to an example, the request length factor may be expressed by the equation:

$$e^{-1*\left(\frac{\left(ActualContentLength - \frac{UserReqLength}{ActualContentLength}\right)^2}{CurveBroadness*UserReqLength}\right)}$$

In this equation, the term ActualContentLength is a value based on a length of time associated with viewing or consuming a content piece or content file. The term UserReqLength is a value associated with a length of time associated with a content package. The UserReqLength may vary. Exemplary value ranges for the UserReqLength includes 0 up 2 minutes, 0 up to 10 minutes, 0 up to 30 minutes, 0 up to an hour, 0 up to 2 hours, 0 up to 3 hours and 0 up to 12 hours. A system user of the CPP system 100 may designate this value when sending a user request for a content package, or this value may be assigned by the CPP system 100 or received or derived from other sources. The CurveBroadness is a value which describes the slope of a distribution curve which may be associated with a content type which may be assigned to a content piece or a content file. Content types may include video, audio or text, or one or more subtypes, such as movies, action movies, music, graphical presentations, music, etc. Different curve broadness values may be determined by empirical evidence, estimates or imported from external sources and utilized in the CPP system 100. In the equation, the variables may be the same as the corresponding variables described above with respect to FIGS. 4 and 5. This equation describes curves which are similar to those shown in FIGS. 4 and 5.

The specified interests factor may be based on at least one specified interests term which may be associated with a content file attribute, a category of content, and/or a descriptive term utilized in the package generator 102 to quantify an impact on a calculated inclusion value. According to an example, the specified interests term may be designated by the user to relate to at least one content file attribute associated with content files. For example, the specified interests factor may be based on a mood identified as "party mood" in the user request 106. Based on a specified interests term "party mood" in user request 106, the package generator 102 scans content files to determine the impact of the specified interests factor upon the calculated inclusion values. The impact may be based on weighting criteria associated with the one or more attributes in one or more content files. The specified interests term(s) may be proposed by the requesting user in the user request 106, or may determined by the CPP system 100 based on other criteria.

The population rating factor may be based on a content rating attribute which links a content file to a user profile. The user profile may be a friend user profile or a general population user profile. The content rating attribute may include one or more content rating values based on content rating of a content file made by any user in the general population. The content rating values by the users may be used to quantify the population rating factor and its impact on the calculated inclusion value of a content file.

The content usage factor may be based on at least one attribute associated with a content file which describes the various users which have utilized the content file. The attribute may be used to quantify an impact of the content usage factor on the calculated inclusion value. Usage may be by the requesting user and/or other users in the population of all users, including friend users.

The location-based information factor may be based on collected location-based information associated with the requesting user identity and/or other users in the population of all users including friend users, to determine an impact on the calculated inclusion value of a content file.

The factors described herein may be utilized separately or in any combination to calculate an impact on the calculated inclusion value of a content piece. For example, a combination of factors to calculate an impact on a calculated inclusion value may include the social networking factor, the content aging factor and the request length factor in a relationship which is described by the equation in which InclusionValueImpact=SocialNetworkingFactor*ContentAgingFactor*RequestLengthFactor.

An example of a more specific equation to describe a similar relationship is described by the equation in which $$InclusionValueImpact = \frac{RatingsByFriends^{(RatingsByUsers)}}{MaxRating^{(MaxRating)}} * e^{-1*\left(\frac{ContentAge}{ContentDecayFactor*UserAgeGroup}\right)} *$$

$$maxProbabDistr * e^{-1*\left(\frac{\left(ActualContentLength - \frac{UserReqLength}{ActualContentLength}\right)^2}{CurveBroadness*UserReqLength}\right)}.$$

Figure 6:
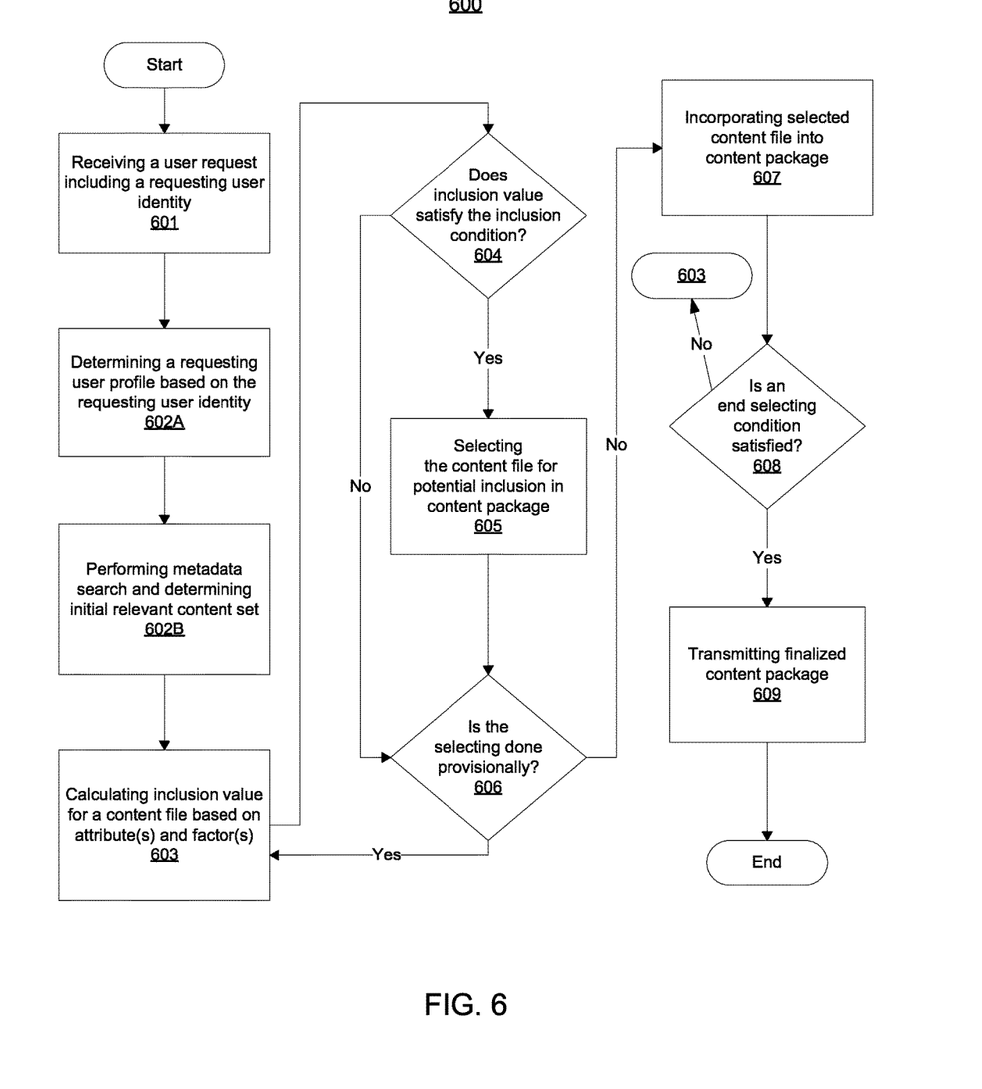
FIG. 6 is a flow diagram illustrating a method for preparing a content package which may be performed using the system in FIG. 1A, according to an example.

FIG. 6 illustrates a method 600 for preparing a content package, according to an embodiment. The steps of the method 600 and of other methods described herein are described by way of example with the CPP system 100. The methods may be performed by other systems.

At step 601, the data management module 101 of the CPP system 100 shown in FIG. 1 receives the user request 106 which includes a requesting user identity. The requesting user identity may be a registration number or other identifier associated with a requesting user. The user request 106 may include other information, such as content package length value or a content package modifier, such as a mood.

At step 602A, the data management module 101 determines a requesting user profile based on the requesting user identity. The requesting user profile may be associated with the user profile database 151 in the package generator 102 of the CPP system 100.

At step 602B, the data management module 101 then performs a preliminary meta data search using one or more of the factors described above and/or other criteria to identify an initial relevant content set for further analysis to determine the inclusion value to be associated with each content piece or content file in the relevant content set. The size of the initial relevant content set may be specified by the user, the CPP system 100 or some other criteria. For example, in those circumstances where the content package need not be delivered in real-time, a smaller or larger initial relevant content set may be specified. A smaller initial relevant content set may be more deeply analyzed in the time frame before delivery of the content package is scheduled. A larger initial relevant content set may be analyzed if the time frame before delivery of the content package is larger. The methods and criteria by which an initial relevant content set is specified are known to those of ordinary skill in the art.

At step 603, the inclusion value engine 153 of the package generator 102 calculates an inclusion value for a content file. The calculating may be based on one or more profile attributes associated with the requesting use profile, one or more content file attributes of the content file and one or more factors. The factors may include the social networking factor, the content aging factor, request length factor and/or other factors. The factors may be utilized separately or in any combination to calculate an impact on the calculated inclusion value of a content piece. For example, a combination of factors to calculate an impact on a calculated inclusion value may include the social networking factor, the content aging factor and the request length factor in a relationship that may be generally described by the equation in which Inclusion ValueImpact=SocialNetworkingFactor*ContentAgingFactor*RequestLengthFactor.

An example of a more specific equation to describe a similar relationship is described by the equation in which $$InclusionValueImpact =$$

$$\frac{RatingsByFriends^{(RatingsByUsers)}}{MaxRating^{(MaxRating)}} * e^{-1*\left(\frac{ContentAge}{ContentDecayFactor*UserAgeGroup}\right)} *$$

$$maxProbabDistr * e^{-1*\left(\frac{\left(ActualContentLength - \frac{UserReqLength}{ActualContentLength}\right)^2}{CurveBroadness*UserReqLength}\right)}.$$

At step 604, the inclusion value engine 153 of the package generator 102 determines whether the calculated inclusion value satisfies an inclusion condition. If the calculated inclusion value fails to satisfy the inclusion condition, the package generator 102 excludes the content file from the content package.

If the calculated inclusion value does satisfy the inclusion condition, the content file is excluded from the content package, at step 605 the package generator 102 selects, or provisionally selects the content file for the content package. The package generator 102, at step 606, may determine whether selecting step is performed provisionally.

At step 607, the content file merge module 154 incorporates the selected content file into a content package. The content package may be a provisional content package or a final content package. The package generator 102, at step 606, determines the selecting step is performed provisionally and the content package is either a provisional or a final content package, the package generator 102, at step 608, determines if an end selecting condition is satisfied.

If the package generator 102, at step 608, determines that an end selecting condition is satisfied, at step 609, content file merge module 154 finalizes the content package and the reporting module 104 transmits the finalized content package from the CPP system 100.

Content Sources

Content sources may include any source of content files and/or content objects, including movies, television and audio programming, such as provided by television/cable broadcasters or other video or audio programming production studios. Content sources may provide video content in a variety of formats in high definition and standard definition, such as, for example, 1080p, 1080i, 720p, 480p, 480i, and any other suitable format. Distribution facilities for distributing content may include a cable system headend, a satellite media distribution facility, a television broadcaster, or any other suitable facility for distributing video content (e.g., through television channels, video-on-demand channels, pay-per-view channels) and audio content (e.g., through analog or digital music channels) to a user client device. Distribution facilities may distribute other types of content such as web pages, interactive applications (e.g., games, shopping applications), etc.

Numerous different distribution facilities may provide content associated with content file records in the content file database of the CPP system 100. The distribution facilities may be connected to various user client devices. Such user client devices may be located, for example, in the homes of users. User client devices may include user television equipment, user computer equipment, user mobile devices or any other type of equipment suitable for accessing media such as television and music programming, web pages, etc. User client devices may include a personal computer or a hand-held device such as a PDA or web-enabled cellular telephone that incorporates a web browser. In another example, the user client device may be connected to a server which uses the Internet as a transmission medium but does not use a web browser or web sites. In a similar example, a user's client device may run a client application that enables the user to access media. In another example, the communications network utilized may be a private communications network, such as a cellular phone network, which does not include the Internet. In yet another example, the communications network may includes a private communications network and the Internet. A service provider for a cellular telephone or other mobile-device service provider may provide Internet access to its subscribers via a private communications network, and may provide content such as video clips or television programming to its subscribers via the Internet and its own network.

Platform

Figure 7:
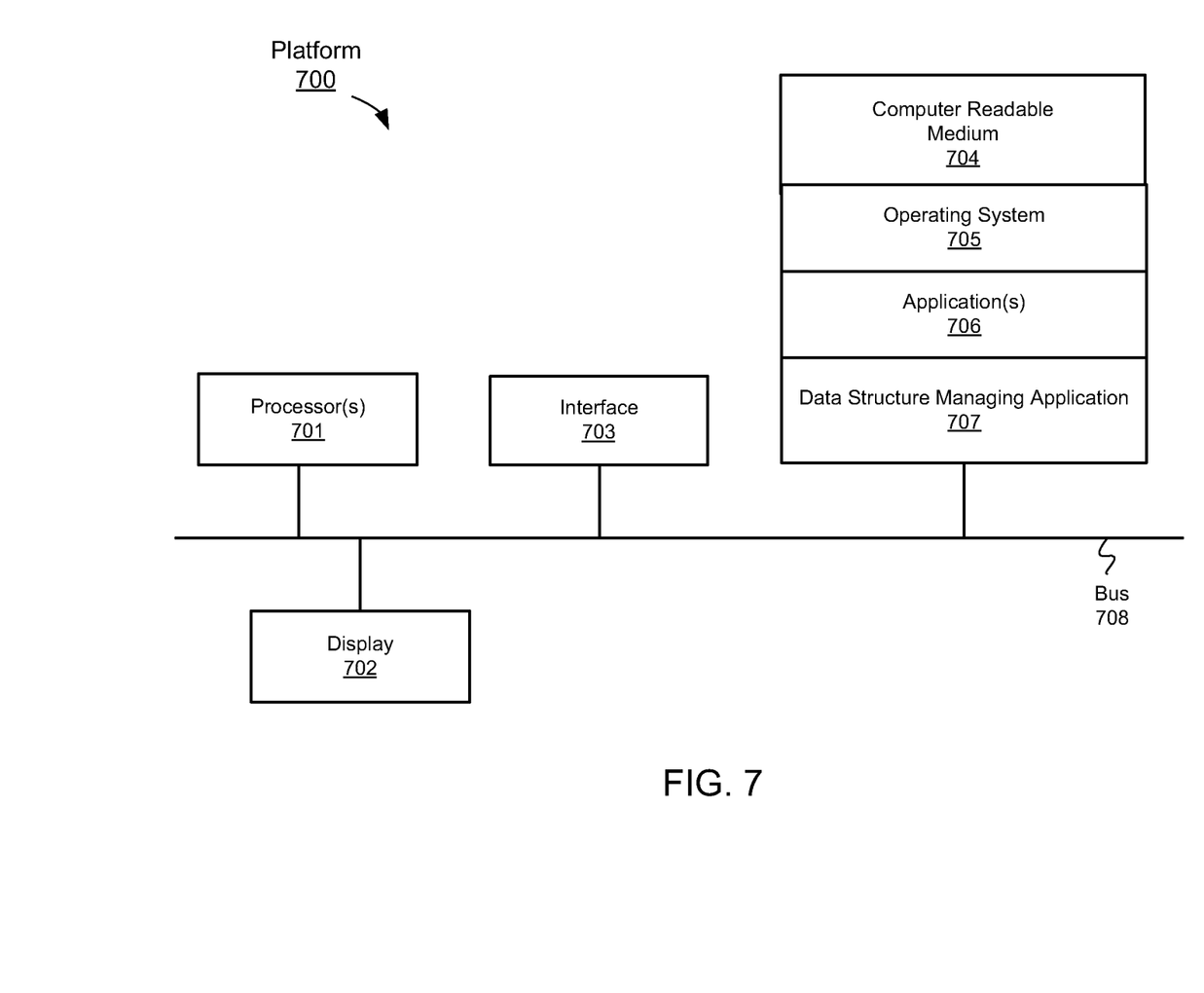
FIG. 7 is a block diagram illustrating a computer system which may provide a platform for the system in FIG. 1A, and/or for a client device that may transmit a user request for, and/or receive, a content package prepared using the system in FIG. 1A, according to examples.

Turning now to FIG. 7, there is shown a platform 700, which may be employed as a computing device in a CPP system, such as CPP system 100. The platform 700 may also be used as a client device which may transmit requests and/or receive a content package prepared by the CPP system 100. It is understood that the illustration of the platform 700 is a generalized illustration and that the platform 700 may include additional components and that some of the components described may be removed and/or modified without departing from a scope of the platform 700.

The platform 700 includes processor(s) 701, such as a central processing unit; a display 702, such as a monitor; an interface 703, such as a simple input interface and/or a network interface to a Local Area Network (LAN), a wireless 802.11x LAN, a 3G or 4G mobile WAN or a WiMax WAN; and a computer-readable medium 704. Each of these components may be operatively coupled to a bus 708. For example, the bus 708 may be an EISA, a PCI, a USB, a FireWire, a NuBus, or a PDS.

A computer readable medium (CRM), such as CRM 704 may be any suitable medium which participates in providing instructions to the processor(s) 701 for execution. For example, the CRM 704 may be non-volatile media, such as an optical or a magnetic disk; volatile media, such as memory; and transmission media, such as coaxial cables, copper wire, and fiber optics. Transmission media can also take the form of acoustic, light, or radio frequency waves. The CRM 704 may also store other instructions or instruction sets, including word processors, browsers, email, instant messaging, media players, and telephony code.

The CRM 704 may also store an operating system 705, such as MAC OS, MS WINDOWS, UNIX, or LINUX; applications 706, network applications, word processors, spreadsheet applications, browsers, email, instant messaging, media players such as games or mobile applications (e.g., "apps"); and a data structure managing application 707. The operating system 705 may be multi-user, multi-processing, multitasking, multithreading, real-time and the like. The operating system 705 may also perform basic tasks such as recognizing input from the interface 703, including from input devices, such as a keyboard or a keypad; sending output to the display 702 and keeping track of files and directories on CRM 704; controlling peripheral devices, such as disk drives, printers, image capture device; and managing traffic on the bus 708. The applications 706 may include various components for establishing and maintaining network connections, such as code or instructions for implementing communication protocols including TCP/IP, HTTP, Ethernet, USB, and FireWire.

A data structure managing application, such as data structure managing application 707 provides various code components for building/updating a computer readable system (CRS) architecture, for a non-volatile memory, as described above. In certain examples, some or all of the processes performed by the data structure managing application 707 may be integrated into the operating system 705. In certain examples, the processes may be at least partially implemented in digital electronic circuitry, in computer hardware, firmware, code, instruction sets, or any combination thereof.

Technical Effect

Technical effects associated with systems and methods associated with a CPP system, such as CPP system 100, includes the dashboard 105 and through which the CPP system 100 provides information to a user.

The CPP system 100 provides a technical tool for efficient search, retrieval and evaluation of content files and user profiles in the CPP system 100. Utilizing the data management module 101, the CPP system 100 may modify a processing load on a processor, such as processor(s) 701. In addition, the functions/steps of processing the CPP system 100 data using the CPP system 100 provides information to the user through the reporting module 104, the dashboard 105 and in the form of a technical tool for an intellectual task the user has to master, and hence contributes to the technical solution of a technical problem of efficient search, retrieval and evaluation of the CPP system 100 data. The easily used reporting module 104, the dashboard 105 and, in managing the CPP system 100 data allows the user to grasp the availability of content packages and the progress content package preparation faster and more accurately, thus facilitating content package delivery, and thus resulting in an improved, continued man-machine interaction.

Although described specifically throughout the entirety of the disclosure, representative examples have utility over a wide range of applications, and the above discussion is not intended and should not be construed to be limiting. The terms, descriptions and figures used herein are set forth by way of illustration only and are not meant as limitations. Those skilled in the art recognize that many variations are possible within the spirit and scope of the examples. While the examples have been described with reference to examples, those skilled in the art are able to make various modifications to the described examples without departing from the scope of the examples as described in the following claims, and their equivalents.

What is claimed is:

1. A system for preparing a content package, the system comprising:
   a dashboard to
      receive a user request including a requesting user identity;
   a data manager, executed by at least one hardware processor, to
      determine a requesting user profile based on the requesting user identity; and
   a package generator, executed by the at least one hardware processor, to determine an inclusion value for a content file based on
  at least one profile attribute associated with the requesting user profile,
    a social networking factor based on the at least one profile attribute associated with the requesting user profile linking the requesting user identity to at least one friend user identity having an associated friend user profile, a content rating attribute linking the content file to the friend user profile, a content rating value associated with the content rating attribute and the friend user profile, and content rating values assigned by non-friend users to the content file, wherein the friend user profile is associated with users in a population including friend users and the non-friend users, wherein the friend users and the non-friend users are respectively identified as friends and non-friends of a requesting user associated with the requesting user identity,
    a content aging factor based on a content age value associated with the content file, wherein the content age value represents a length of time which grows as the content file ages with respect to a starting point in time associated with the content file, and
    a request length factor based on a content file length value associated with the content file, and
  compare the determined inclusion value to an inclusion condition, and if the determined inclusion value satisfies the inclusion condition,
    select the content file for the content package, and incorporate the selected content file into the content package.

2. The system of claim 1, wherein
the at least one package generator is to further determine the inclusion value based on a population rating factor based on the content rating value linking the content file to a plurality of user profiles, and
the plurality of user profiles include the content rating value linked with the content rating attribute associated with the content file.

3. The system of claim 1, wherein
the at least one package generator is to further determine the inclusion value based on a specified interest factor based on at least one package modifier designated by a user associated with the requesting user identity and at least one content file attribute associated with the content file, and
the at least one package modifier includes a mood associated with the user associated with the requesting user identity.

4. The system of claim 1, wherein the at least one profile attribute associated with the requesting user profile includes an authorization of the requesting user associated with the requesting user identity to use the content file that is selected for the content package.

5. The system of claim 1, wherein the at least one profile attribute associated with the requesting user profile includes a history of usage of the content file that is selected for the content package by the requesting user associated with the requesting user identity.

6. The system of claim 1, wherein the content aging factor is determined as a function of the content age value based on an age associated with the content file, a value associated with a content type assigned to the content file, a value associated with a defined age group, and a scaling factor for maximum probability distribution.

7. The system of claim 1, wherein
the request length factor is determined as a function of a value based on a length of time associated with viewing or consuming the content file, a value associated with a length of time associated with the content package, and a value which describes a slope of a distribution curve associated with a content type assigned to the content file.

8. A method for preparing a content package, the method comprising:
determining, by a package generator that is executed by at least one hardware processor,
  an inclusion value for a content file based on
    a population rating factor based on a content rating value linking the content file to a plurality of user profiles, wherein the plurality of user profiles include the content rating value linked with a content rating attribute associated with the content file, and
    a content aging factor based on a content age value associated with the content file, wherein the content age value represents a length of time which grows as the content file ages with respect to a starting point in time associated with the content file, and
  whether the inclusion value satisfies an inclusion condition, and in response to a determination that the inclusion value satisfies the inclusion condition,
    selecting the content file for the content package, and incorporating the selected content file into the content package.

9. The method of claim 8, wherein the inclusion condition is based on a rolling admissions basis for selecting the content file for the content package.

10. The method of claim 8, wherein selecting the content file for the content package further comprises:
provisionally selecting the content file for the content package based on the inclusion value; and
replacing, from the content package, the content file with another content file including a higher inclusion value.

11. The method of claim 8, further comprising:
determining, by a data manager that is executed by the at least one hardware processor, a requesting user profile based on a requesting user identity; and
determining, by the package generator that is executed by the at least one hardware processor,
  the inclusion value for the content file further based on
    at least one profile attribute associated with the requesting user profile, and
    a social networking factor based on the at least one profile attribute associated with the requesting user profile linking the requesting user identity to at least one friend user identity having an associated friend user profile, the content rating attribute linking the content file to the friend user profile, and the content rating value associated with the content rating attribute and the friend user profile.

12. The method of claim 11, wherein the social networking factor is further based on content rating values assigned by non-friend users to the content file.

13. The method of claim 8, wherein the content aging factor is further based on a content decay factor.

14. The method of claim 13, wherein the content decay factor provides for a reduction in a decrease in the inclusion value for a corresponding increase in the content age value.

15. A non-transitory computer readable medium having stored thereon machine readable instructions for preparing a content package, the machine readable instructions when executed cause at least one hardware processor to:
- determine, by a data manager that is executed by the at least one hardware processor, a requesting user profile based on a requesting user identity; and
- determine, by a package generator that is executed by the at least one hardware processor,
  - an inclusion value for a content file based on
    - at least one profile attribute associated with the requesting user profile, wherein the at least one profile attribute associated with the requesting user profile includes an authorization of a requesting user associated with the requesting user identity to use the content file that is selected for the content package, and
    - a content aging factor based on a content age value associated with the content file, wherein the content age value represents a length of time which grows as the content file ages with respect to a starting point in time associated with the content file, wherein the content aging factor is further based on a content decay factor which provides for a change in the inclusion value corresponding to a change in the content age value, and
  - whether the inclusion value satisfies an inclusion condition, and in response to a determination that the inclusion value satisfies the inclusion condition,
    - select the content file for the content package, and
    - incorporate the selected content file into the content package.

16. The non-transitory computer readable medium of claim 15, wherein the machine readable instructions to determine, by the package generator that is executed by the at least one hardware processor, the inclusion value for the content file, further comprise machine readable instructions to:
- determine, by the package generator that is executed by the at least one hardware processor, the inclusion value for the content file further based on at least one package modifier designated by the requesting user associated with the requesting user identity and at least one content file attribute associated with the content file, wherein the at least one package modifier includes a mood associated with the requesting user associated with the requesting user identity.

17. The non-transitory computer readable medium of claim 15, wherein the content aging factor is further determined as a function of the content age value based on an age associated with the content file, a value associated with a content type assigned to the content file, a value associated with a defined age group, and a scaling factor for maximum probability distribution.

18. The non-transitory computer readable medium of claim 15, wherein the machine readable instructions to determine, by the package generator that is executed by the at least one hardware processor, the inclusion value for the content file, further comprise machine readable instructions to:
- determine, by the package generator that is executed by the at least one hardware processor, the inclusion value for the content file further based on a request length factor based on a content file length value associated with the content file, wherein the request length factor is determined as a function of a value based on a length of time associated with viewing or consuming the content file, a value associated with a length of time associated with the content package, and a value which describes a slope of a distribution curve associated with a content type assigned to the content file.

19. The non-transitory computer readable medium of claim 15, wherein the content decay factor provides for a reduction in a decrease in the inclusion value for a corresponding increase in the content age value.

* * * * *